US011213044B2

(12) United States Patent
Kaplan et al.

(10) Patent No.: US 11,213,044 B2
(45) Date of Patent: Jan. 4, 2022

(54) NUTRITIOUS SWEETENERS AND METHODS OF PRODUCING SAME

(71) Applicant: MATOK V'KAL LTD, Caesarea (IL)

(72) Inventors: Noam Kaplan, Tel-Aviv (IL); Tal Leizer, Zikhron Yaacov (IL); Danny Dizer, Rishon Lezion (IL)

(*) Notice: Subject to any disclaimer, the term of this patent is extended or adjusted under 35 U.S.C. 154(b) by 260 days.

(21) Appl. No.: 16/472,881

(22) PCT Filed: Nov. 23, 2017

(86) PCT No.: PCT/IL2017/051280
§ 371 (c)(1),
(2) Date: Jun. 23, 2019

(87) PCT Pub. No.: WO2018/116292
PCT Pub. Date: Jun. 28, 2018

(65) Prior Publication Data
US 2019/0335785 A1 Nov. 7, 2019

Related U.S. Application Data (60) Provisional application No. 62/439,036, filed on Dec. 25, 2016.

(51) Int. Cl.
*A23G 3/38* (2006.01)
*A23L 27/30* (2016.01)
(Continued)

(52) U.S. Cl.
CPC ............... *A23G 3/38* (2013.01); *A23G 3/42* (2013.01); *A23G 3/44* (2013.01); *A23G 3/52* (2013.01);
(Continued)

(58) Field of Classification Search
CPC ... A23G 3/38; A23G 3/42; A23G 3/44; A23G 3/52; A23L 27/37; A23L 33/21; A23L 33/185; A23V 2002/00
(Continued)

(56) References Cited

U.S. PATENT DOCUMENTS 5,009,916 A 4/1991 Colliopoulos
2005/0013923 A1 1/2005 Shimek et al.
(Continued)

FOREIGN PATENT DOCUMENTS

EP 2859799 4/2015
JP 2009100658 A * 5/2009
(Continued)

OTHER PUBLICATIONS

Translation of Akimoto (JP-2009100658-A) (Year: 2009).*
Examination Report in RU2019115262, dated Jan. 24, 2020.

*Primary Examiner* — Brent T O'Hern
(74) *Attorney, Agent, or Firm* — Alphapatent Associates, Ltd; Daniel J. Swirsky (57) ABSTRACT

The present invention, in some embodiments thereof, relates to low calorie, and nutritious sweeteners and confectioneries. The sweeteners and confectioneries of the invention are enriched with at least one type of soluble fibers and with proteins and include limited amounts of sweetening agents. The present invention further relates to methods of manufacturing the herein disclosed sweeteners and confectioneries.

16 Claims, 1 Drawing Sheet

(51) Int. Cl.
    *A23L 33/21*     (2016.01)
    *A23L 33/185*    (2016.01)
    *A23G 3/42*      (2006.01)
    *A23G 3/44*      (2006.01)
    *A23G 3/52*      (2006.01)

(52) U.S. Cl.
    CPC ............. *A23L 27/37* (2016.08); *A23L 33/185* (2016.08); *A23L 33/21* (2016.08); *A23V 2002/00* (2013.01)

(58) Field of Classification Search
    USPC ......................................................... 426/572
    See application file for complete search history.

(56) References Cited

U.S. PATENT DOCUMENTS

| | | | |
|---|---|---|---|
| 2008/0311265 A1* | 12/2008 | MacDonald | A23L 33/21 426/534 |
| 2009/0181145 A1 | 7/2009 | Pandey et al. | |
| 2010/0136195 A1 | 6/2010 | Coleman | |
| 2012/0004399 A1* | 1/2012 | Mason | A23L 15/00 530/427 |

FOREIGN PATENT DOCUMENTS

| | | |
|---|---|---|
| JP | 2009100658 A | 5/2009 |
| RU | 2428049 C2 | 9/2011 |
| RU | 2435442 C2 | 12/2011 |
| WO | 2008055510 A1 | 5/2008 |
| WO | 2016049577 A1 | 3/2016 |

\* cited by examiner

NUTRITIOUS SWEETENERS AND METHODS OF PRODUCING SAME

CROSS-REFERENCE TO RELATED APPLICATIONS

This application is a U.S. National Phase Application under 35 U.S.C. 371 of International Application No. PCT/IL2017/051280, which has an international filing date of Nov. 23, 2017, and which claims priority benefit from U.S. Provisional Application No. 62/439,036, filed Dec. 25, 2016, the disclosure of which is incorporated herein by reference in its entirety.

FIELD OF THE INVENTION

The present invention, in some embodiments thereof, relates to low calorie, and nutritious sweeteners and confectioneries. The sweeteners and confectioneries of the invention are enriched with at least one type of soluble fibers and with proteins and include limited amounts of sweetening agents. The present invention further relates to methods of manufacturing the herein disclosed sweeteners and confectioneries.

BACKGROUND OF THE INVENTION

The modern desire to consume low calorie sweet foods has led to the development of a variety of sweeteners (referred to herein as "sweetening agents"). Sweetening agents are generally used as sugar substitutes to limit blood sugar levels and to assist in weight loss. Sweetening agents also allow diabetes patients to consume sweet foods and beverages.

Sweetening agents are generally divided to bulk sweetening agents, and to artificial or synthetic sweetening agents. Bulk sweetening agents (e.g., Erythritol) are derivatives of sugars, and while they are not as sweet as sucrose, they have fewer calories as the body metabolizes them differently. Bulk sweetening agents may exhibit different physiological effects upon consumption. For example, many bulk sweetening agents do not raise blood glucose levels, and so can be consumed by diabetics. Further, some of those agents cause a laxative effect when consumed in large quantities. Artificial or synthetic sweetening agents (e.g., sucralose) present much higher sweetness sensation than sucrose. Accordingly, a reduced amount of sweetening agents is required as compared to sucrose in order to produce equivalent sweetness intensity. Nevertheless, the sweetness sensation caused by those compounds is notably different from sucrose, and the energy consumption is significantly reduced. Moreover, those products lack nutritional value and may increase craving for sweets and accelerate hunger sensation.

There is an on-going need for improved, low calorie sugar substituents which will be nutritious, prolong satiety sensation and which could be used to sweeten beverages and foods.

SUMMARY OF THE INVENTION

The present invention relates to low calorie and nutritious sweetener compositions. The sweetener compositions of the invention comprise relatively high amounts of at least one type of soluble fibers, a protein and relatively low amounts of a sweetening agent. The sweetener compositions of the invention effectively solubilize in aqueous solutions and therefore can be consumed to sweeten beverages (hot and lukewarm) and foods. The sweetener compositions of the invention may present a meringue-like form and may thus be consumed as a confectionary.

Thus, according to one aspect, the present invention provides a nutritious sweetener composition comprising:
  at least one type of a soluble protein or at least one source of a protein;
  at least type of a soluble fiber or at least one source of a fiber; and
  at least one type of a sweetening agent;
  wherein the amount of the soluble fiber is at least about 20% by weight of the composition, and wherein the amount of the sweetening agent is between about 0.05% to about 10% by weight of the composition.

According to another aspect, the present invention provides a nutritious sweetener composition comprising:
  at least about 1.5% by weight of the composition of a soluble protein, or a source of a protein;
  at least about 30% by weight of the composition of one, or more types of soluble fibers or one or more sources of fibers; and
  a sweetening agent in an amount that does not exceed about 10% by weight of the composition.

According to yet another aspect, the present invention provides a low calorie and nutritious confectionery, the confectionery comprising:
  at least one type of a soluble protein, or at least one source of protein;
  at least one type of soluble fibers, or at least one source of soluble fiber; and
  at least one sweetening agent,
  wherein the confectionery is provided as an aerated solid food product.

According to yet another aspect, the present invention provides a low calorie and nutritious confectionery, the confectionery comprising:
  at least one type of a soluble protein, or at least one source of protein;
  at least one type of soluble fibers, or at least one source of soluble fiber;
  a sweetening agent, and
  a foam forming agent;
  wherein the confectionery is provided as an aerated solid food product.

According to some embodiments, the protein is a plant derived protein.

According to some embodiments, the protein is selected from the group consisting of: a potato protein, a bean protein, a rice protein, a soy protein, a wheat protein, a chickpea protein, a yeast protein, a seaweed protein, and a combination thereof.

According to some embodiments, the protein is present in the composition in an amount of at least about 1.5% by weight of the composition.

According to some embodiments, the protein is present in the composition at about 1.5% to about 10% by weight of the composition.

According to some embodiments, the fiber is selected from the group consisting of: oligofructose, cyclodextrin, corn dextrin, wheat dextrin and a combination thereof.

According to some embodiments, the sweetener composition comprises a combination of a first fiber and a second fiber. According to some embodiments, the first fiber is a corn dextrin and the second fiber is an oligofructose. According to some embodiments, the oligofructose is present in the composition in an amount of at least about 30% by weight of the composition and the corn dextrin is present in the composition in an amount of at least about 15% by weight of the composition.

According to some embodiments, the sweetening agent is a high intensity sweetening agent. According to some embodiments, the high intensity sweetening agent is selected from the group consisting of: sucralose, aspartame, cyclamate, saccharin, stevia, acesulfame potassium, lead acetate, neotame, alitame, and monk fruit. According to some embodiments, the sweetening agent is sucralose. According to some embodiments, the sweetening agent is present in the composition in an amount of between about 0.01% to about 5% by weight of the composition.

According to some embodiments, the composition comprises at least one of a foam forming agent. According to some embodiments, the foam forming agent is selected from a sodium bicarbonate and an emulsifier. It should be noted that the emulsifier is not necessary in the food product. According to some embodiments, the sweetener composition further comprises at least one type of an emulsifier. According to some embodiments, the emulsifier is selected from a sucrose ester, lecithin, an ester of monoglycerides of fatty acids, and an ester diglycerides of fatty acid. According to some embodiments, the emulsifier is a sucrose ester. According to some embodiments, the emulsifier is present in the composition in an amount of between about 0.001% to about 1% by weight of the composition.

According to some embodiments, the sweetener composition further comprising sodium bicarbonate. According to some embodiments, the sodium bicarbonate is present in the composition in an amount of between about 0.1% to about 2% by weight of the composition.

According to some embodiments, the sweetener composition has a form of an aerated solid product. According to some embodiments, the sweetener composition has a form of a meringue confectionery. According to some embodiments, the aerated solid food product has a weight that ranges between about 0.2 grams to about 3 grams. According to some embodiments, the aerated solid food product has a diameter that ranges between about 5 mm to about 100 mm.

According to some embodiments, the aerated food product has a caloric value of between about 0.3 kcal/g to about 3 kcal/g.

According to some embodiments, the aerated solid food product has a bulk density within the range of about 20 gr/l to about 400 gr/l.

According to some embodiments, the sweetener composition is essentially free of at least one or more of: a sugar, a wheat flour, an egg, and water.

According to yet another aspect, the present invention provides a method of producing a nutritious sweetener composition, the method comprising:

solubilizing a protein portion in water and vigorously mixing. in some exemplary embodiments, water is present in the composition in an amount of between about 28% to about 40% by weight of the composition.

while mixing, adding a sweetening agent, and fibers, to thereby obtain a foamy mixture. In some exemplary embodiments, the sweetening agent and fibers are mixed with the protein portion before the protein portion is solubilized in water, and the entire mixture is solubilized in water.

The method then comprises pouring portions of the foamy mixture into molds having the shape and size of a meringue confectionery. In some exemplary embodiments, the foamy mixture is poured freely towards a working space or a conveyor belt, for example using an automated piping bag or a pastry bag, which pour the mixture in a predefined shape. The method then comprises drying the mixtures, to thereby obtain confectionary sweetener meringue food product.

According to some embodiments, the step of solubilizing protein includes mixing the water with the protein and further with a sodium bicarbonate.

According to some embodiments, the protein is solubilized in water having a temperature of no more than about 30° C.

According to some embodiments, following the step of solubilizing the protein, the solution is mixed and maintained at a temperature of no more than about 30° C. According to some embodiments, the step of mixing and maintaining is continued for a period of about 10 minutes. According to some embodiment, the step of vigorously mixing is performed using a beater. According to some embodiment, the step of vigorously mixing is performed using a continuous aerator. According to some embodiment, the step of adding further comprises adding an emulsifier. According to some embodiments, the step of mixing and adding to obtain a foamy mixture is performed for a time period of between about 1 minute to about 1 hour.

According to some embodiments, the meringue units or products are dried at an oven at a temperature of between about 40° C. to about 85° C. for a period of 30 minutes to 3 hours.

According to some embodiments, the moisture inside said oven does not exceed 80%.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

DESCRIPTION OF SPECIFIC EMBODIMENTS OF THE INVENTION

The present invention, in some embodiments thereof, relates to low calorie and nutritious sweetener compositions. The inventors of the present invention devised and prepared novel sweetener compositions which are enriched with fibers, and proteins and that include a limited amount of a sweetening agent. In some embodiments of the invention, the sweetener composition may be consumed to sweeten beverages and/or foods. In some further embodiments of the invention, the sweetener of the invention has a form of a meringue that can be consumed as a confectionary or as a sweet snack.

The sweetener compositions of the invention advantageously present the following attributes:

i) high solubility in liquids (such as beverages or drinks), enabling efficient and rapid sweetening effect;

ii) high amounts of fibers provided as bulking agents and as prebiotic agents and contributing to a sustained satiety sensation;
iii) presence of emulsifiers which effect foaming, thus further contributing to a sustained satiety sensation;
iv) efficient sweetening effect with limited amounts of a sweetening agent;
v) can be consumed to sweeten beverages and foods;
vi) can be consumed as a confectionary or as a sweet snack;
vii) low calorie and low fat.

Thus, the present invention provides in one aspect, a sweetener composition comprising: a soluble protein; one or more types of soluble fibers; and a sweetening agent.

The present invention provides in another aspect, a sweetener composition comprising:
at least about 1.5% by weight of the composition of a soluble protein;
at least about 30% by weight of the composition of one or more types of soluble fibers; and
a sweetening agent in an amount that does not exceed about 10% by weight of the composition.

The present invention provides in yet a further aspect, a sweetener composition comprising a soluble protein; one or more types of soluble fibers; and a sweetening agent, wherein the sweetener composition exhibits a solid aerated form or structure, or texture.

As used herein the term "sweetener composition" refers to a composition comprising compounds which may be used as sugar substitutes to sweeten beverages or drinks and foods and/or as stand-alone sweet snacks or confectioneries.

The sweetener compositions of the invention include one or more sweetening agent.

As used herein the term "sweetening agent" is interchangeable with the terms "artificial sweetening agent" and "sugar substitute". Sweetening agents are typically provided as sugar substitutes to reduce calorie consumption, and/or to afford diabetic patients to consume sweet drinks and foods and/or to regulate blood glucose levels.

According to some embodiments of the invention, the sweetening agent is a high intensity sweetener. Exemplary high intensity sweetening agents include, but are not limited to, sucralose, aspartame, cyclamate, saccharin, stevia, acesulfame potassium, lead acetate, neotame, alitame, and monk fruit. Each possibility represents a separate embodiment of the invention. According to one embodiment, the sweetening agent is sucralose.

According to some embodiments of the invention, the sweetening agent is a bulk sweetening agent. Exemplary bulk sweetening agents include, but are not limited to, erythritol, isomalt, lactitol, maltitol, sorbitol, agave nectar, and xylitol. According to other embodiments, the sweetener composition does not include a bulk sweetening agent.

Typical known sweetening compositions include a very high percentage of a sweetening agent (e.g., more than about 90% w/w). The sweetener compositions of the present invention advantageously include significantly reduced amounts of a sweetening agent in the composition.

According to some embodiments, the sweetening agent is present in the composition at about 0.01% to about 10%, about 0.01% to about 8%, about 0.01% to about 6%, about 0.01% to about 5% by weight of the composition, about 0.01% to about 4% by weight of the composition, about 0.01% to about 3% by weight of the composition, about 0.01% to about 2% by weight of the composition, about 0.01% to about 1% by weight of the composition, about 0.01% to about 0.5% by weight of the composition, about 0.1% to about 3% by weight of the composition, about 0.1% to about 2% by weight of the composition, about 0.2% to about 10%, about 0.2% to about 7%, about 0.2% to about 5%, about 0.2% to about 4%, about 0.3% to about 10%, about 0.3% to about 8%, about 0.3% to about 6%, about 0.3% to about 4%, about 0.3% to about 3%, about 0.3% to about 2%, about 0.3% to about 1%, or about 0.1% to about 1% by weight of the composition. Each possibility represents a separate embodiment of the invention. According to some embodiments, the sweetening agent is present in the composition, in an amount the does not exceed about 20%, about 15%, about 10%, about 5%, about 3%, about 2% or about 1% by weight of the composition. Each possibility represents a separate embodiment of the invention.

The sweetener composition of the invention may further include a portion of a protein. The protein as used within the compositions of the present invention may be for example a plant derived protein. The term "plant derived protein" means that the protein is obtained from a plant. As used herein the term "source of protein" means the source from which the protein is obtained or derived, for example, an extract of the source of protein (for example a certain plant) having a particular degree of purification. Suitable plants include, without limitations, legume plants, grain plants, and solanaceae plants. The protein as used within the compositions of the present invention may be for example a whey protein, a pee protein, a soy protein, a casein protein, a rice protein, a potato protein, a chickpea protein, a yeast protein, a seaweed protein, a wheat protein, a sunflower protein, or a combination thereof. According to some embodiments, the protein is water soluble. According to some embodiments, the protein is derived from a solanaceae plant. According to some embodiments, the solanaceae plant is a potato plant and the protein is for example solanic 300. According to some embodiments, the protein is isolated from a certain type of a plant or from another source. According to some embodiments, the protein is present in the composition at about 0.5% to about 15% by weight of the composition, about 0.5% to about 10% by weight of the composition, about 0.5% to about 8% by weight of the composition, about 0.5% to about 5% by weight of the composition, about 1% to about 15% by weight of the composition, about 1% to about 10% by weight of the composition, about 1% to about 8% by weight of the composition, about 1% to about 6% by weight of the composition, or about 1.5% to about 5% by weight of the composition. Each possibility represents a separate embodiment of the invention. According to some embodiments, the protein is present in the composition, at no more than about 5%, about 7%, about 10% or about 15% by weight of the composition. Each possibility represents a separate embodiment of the invention.

As used herein the term "fibers" is interchangeable with the term "fibers" or "dietary fibers". Fibers are typically referred to as the indigestible portion of food derived from plants. Fibers according to some embodiments of the invention are soluble fibers. Soluble fibers absorb water to form a gel, and may be fermented by bacteria within the large intestine. Increasing the amount of soluble dietary fiber in the diet may increase the feeling of fullness, or satiety, and contribute to weight management. As used herein the term "source of fiber" means the source from which the fiber is obtained or derived, for example, an extract of the source of fiber (for example a certain plant) having a particular degree of purification. Typical fiber sources include oats, peas, beans, lentils, fruits such as apples, oats, potatoes and some green vegetables. Exemplary soluble fibers include, but are not limited to, corn dextrin (such as Nutriose® 06), oligofructose (such as Orafti® P95 or L95), inulin, cyclodextrin or a combination thereof. According to some embodiments, the fibers are prebiotic.

According to some embodiments, fibers are present in the composition at about 40% to about 95% by weight of the composition, about 45% to about 95% by weight of the composition, about 50% to about 95% by weight of the composition, about 55% to about 95% by weight of the composition, about 60% to about 95% by weight of the composition, about 65% to about 95% by weight of the composition, about 70% to about 95% by weight of the composition, about 75% to about 95% by weight of the composition, about 80% to about 95% by weight of the composition, or about 85% to about 95% by weight of the composition. Each possibility represents a separate embodiment of the invention. According to some embodiments, the composition includes at least about 40%, at least about 45%, at least about 50%, at least about 55%, at least about 60%, at least about 65%, at least about 70%, at least about 75%, at least about 80% or at least about 85% fibers by weight of the composition. Each possibility represents a separate embodiment of the invention.

According to some embodiments, the composition includes one or more fiber types. According to some embodiments, the composition includes a combination of two or more fibers. According to some embodiments, the composition includes a combination of three or more fibers. According to some embodiments, the composition includes a combination of a first fiber and a second fiber. According to some embodiments, the first fiber is present in the composition at about 15% to about 50%, about 15% to about 40%, about 20% to about 40%, or about 20% to about 35% by weight of the composition. Each possibility represents a separate embodiment of the invention. According to some embodiments, the second fiber is present in the composition at about 20% to about 70%, about 35% to about 60%, about 40% to about 60%, or about 35% to about 55% by weight of the composition. Each possibility represents a separate embodiment of the invention. According to some embodiments, the first fiber is corn dextrin. According to some embodiments, the second fiber is oligofructose.

According to some embodiments, the ratio between the protein and the fibers as present within the composition of the invention is within the range of 1:1 to 1:25, 1:5 to 1:20, 1:5 to 1:20, or 1:10 to 1:20. Each possibility represents a separate embodiment of the invention.

Some embodiments of the invention refer to sweetener compositions that further include at least one of a foam forming agent. As used herein the term "foam forming agent" refers to an agent or food additive that affords a foaming effect to a food product. The foam forming agent may include, without limitation an emulsifier or a sodium bicarbonate.

Some embodiments of the herein invention refer to sweetener compositions that further include an emulsifier. The emulsifier is intended to form a foam composition. The emulsifier is further intended to prolong satiety sensation. The emulsifier used may be natural or synthetic. Exemplary emulsifiers, include, but are not limited to, sucrose ester (such as Sisterna® PS750), lecithins, esters of monoglycerides of fatty acids, esters of diglycerides of fatty acids, egg yolk emulsifying agent lecithin, soy lecithin, calcium stearoyl dilaciate (CSL), polyglycerol ester (PGE), sorbitan ester (SOE), pg ester (PGME), monoglyceride (MG), acetylated monoglyceride (AMG), and lactylated monoglyceride (LMG). Each possibility represents a separate embodiment of the invention.

According to some embodiments, one or more emulsifiers are present in the composition at about 0.001% to about 3% by weight of the composition, about 0.01% to about 2% by weight of the composition, or about 0.01% to about 1% by weight of the composition. Each possibility represents a separate embodiment of the invention. According to some embodiments, the composition includes at least about 0.01%, at least about 0.02%, at least about 0.03%, at least about 0.04%, or at least about 0.05% emulsifier by weight of the composition. Each possibility represents a separate embodiment of the invention.

According to some embodiments, the sweetener composition has a white color. According to other embodiments, the sweetener composition may optionally include a food color, to thereby afford a composition or a solid product, such as a meringue that has a color other than white. The food color may be a natural or an artificial food color. Natural food colors are extracted and purified directly from plants, those include, but are not limited to, chlorophyll (a green pigment), beta-Carotene (a yellow-orange pigments), annatto (an orange pigment) and lycopene (a red pigment), or a combination thereof. Artificial food colors may also be incorporated and include, without limitation, brilliant blue (a reddish-blue pigment), and tartrazine (yellow pigment).

According to some embodiments, the composition further includes one or more food additive. Exemplary food additives include, without limitation, antioxidants, flavor enhancers, gelling agent, thickeners, stabilizers, and preservatives.

According to some embodiments, salt is present in the composition. The salt may be sea salt, NaCl, seasoned salt, solubilized salt and the like. salt is present in the composition at about 0.001% to about 0.8% by weight of the composition, about 0.01% to about 0.45% by weight of the composition, or about 0.1% to about 0.55% by weight of the composition. Each possibility represents a separate embodiment of the invention.

According to some embodiments, a sodium bicarbonate (i.e., $NaHCO_3$; a.k.a baking soda) is also included in the composition. Sodium bicarbonate is used herein to afford a foaming effect (gas bubbles). According to some embodiments, the sodium bicarbonate is present in the composition at about 0.1% to about 2%, about 0.1% to about 1.5%, or at about 0.1% to about 1%. Each possibility represents a separate embodiment of the invention.

According to some embodiments, the sweetener composition of the invention is highly soluble (or water soluble). The composition therefore solubilizes rapidly in liquids, such as in beverages and hot drinks. By "water soluble" it is meant that the composition solubilizes to form a solution that is essentially free of any sweetener particles or aggregates. According to some embodiments, the composition solubility depends on the temperature of the liquid. According to some embodiments, the sweetener composition solubilizes in liquid within about 10 seconds to about 70 seconds at temperatures of between about 50° C. to 90° C. According to an exemplary embodiment, the sweetener composition solubilizes in liquid within about 10 seconds to about 30 seconds at a temperature that ranges between about 70° C. to about 90° C. According to a further exemplary embodiment, the sweetener composition solubilizes in liquid within about 20 seconds to about 40 seconds at a temperature that ranges between about 60° C. to about 80° C. According to yet further exemplary embodiment, the sweetener composition solubilizes in liquid within about 30 seconds to about 50 seconds at a temperature that ranges between about 50° C. to about 70° C. According to yet further exemplary embodiment, the sweetener composition solubilizes in liquid within about 40 seconds to about 70 seconds at a temperature that ranges between about 50° C. to about 60° C.

According to some embodiments of the invention, the sweetener composition is provided in a solid form. According to some embodiment, the solid sweetener has an aerated form.

Figure 1:
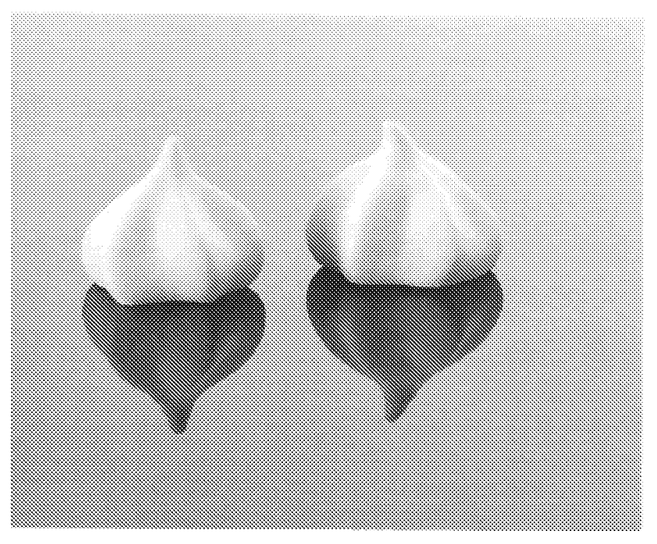
FIG. 1 is a photographic image of an exemplary sweetener that has a meringue-like form, in accordance with some embodiments of the invention.

As used herein the term "aerated" or "aery" is interchangeable with the term "whipped" and means that the sweetener may contain air in it or may include small bubbles structure in which there is air or another gas. According to some embodiments, the solid sweetener is in a form of a meringue confectionery (such as the meringue presented in FIG. 1). The bubbles structure of the sweetener advantageously contributes to the relative low density of the sweeteners. In accordance with those embodiments, the sweetener composition as provided herein has a bulk density or specific gravity within the range of about 20 grams/liters (g/l) to about 400 g/l, about 40 g/l to about 200 g/l, about 40 g/l to about 150 g/l, about 80 g/l to about 120 g/l, between about 90 g/l to about 120 g/l, or between about 90 g/l to about 110 g/l. Each possibility represents a separate embodiment of the invention. According to some embodiments, the sweetener composition, has a density or specific gravity of less than about 400 g/l, less than about 300 g/l, less than about 240 g/l, less than about 180 g/l, less than about 150 g/l, less than about 130 g/l, less than about 120 g/l, less than about 110 g/l, or less than about 100 g/l. Each possibility represents a separate embodiment of the invention.

Typically, meringue confectionery includes high amounts of sugar and eggs. The meringue confectionery of the invention advantageously does not include any amount, or includes a small amount of eggs and/or sugar. Thus, the meringue, or sweetener composition of the invention is essentially free or free of eggs and/or sugar.

The meringue or sweetener compositions of the invention are further essentially free or free of wheat flour.

Some embodiments of the invention refer to solid sweeteners compositions or meringues that are essentially free of water or water-free. As used herein, "essentially free of eggs and/or sugar and/or wheat flour and/or water" means that the meringue or composition has no more than about 6%, no more than about 5%, no more than about 4%, no more than about 3%, no more than about 2%, no more than about 1% no more than about 0.5%, no more than but 0.1%, no more than about 0.05%, no more than about 0.04%, no more than about 0.02%, or no more than about 0.01% by weight of the composition, or having only trace amounts. Each possibility represents a separate embodiment of the invention.

According to some embodiment, each aerated product has a diameter that ranges between about 5 millimeters to about 100, between about 5 millimeters to about 50 millimeters, between about 5 millimeters to about 40 millimeters, between about 5 millimeters to about 30 millimeters, between about 10 millimeters and about 30 millimeters, between about 10 millimeters to about 25 millimeters, or between about 10 millimeters to about 20 millimeters. Each possibility represents a separate embodiment of the invention.

According to some embodiments, each sweetener aerated product has a weight that ranges between about 0.2 grams to about 3 grams, between about 0.2 grams to between about 2 grams, between about 0.2 grams and 1.5 grams, between about 0.2 grams and about 1 grams, between about 0.2 grams and about 0.8 grams, between about 0.2 grams and about 0.7 grams, or between about 0.2 grams and 0.6 grams. Each possibility represents a separate embodiment of the invention.

According to some embodiments, 100 grams of a sweetener composition as provided herein has a caloric value of between about 125 kcal/100 g to about 400 kcal/100 g, between about 150 kcal/100 g to about 400 kcal/100 g, between about 125 kcal/100 g to about 350 kcal/100 g, between about 60 kcal/100 g to about 300 kcal/100 g, between about 125 kcal/100 g to about 250 kcal/100 g, between about 30 kcal/100 g to about 250 kcal/100 g, or between about 200 kcal/100 g to about 250 kcal/100 g. Each possibility represents a separate embodiment of the invention. According to some embodiments, each sweetener product that weighs about 0.4 grams has a caloric value of between about 0.4 kcal/g to about 3 kcal/g, between about 0.5 kcal/g to about 2.5 kcal/g, between about 0.5 kcal/g to about 2 kcal/g, or between about 0.5 kcal/g to about 1.5 kcal/g. Each possibility represents a separate embodiment of the invention.

The sweetener compositions may be stored and packed in a package or container that is hermetically sealed and that may optionally include a barrier that prevents any gas and/or water vapors penetration therethrough. The packages used preferably preserve the quality of the sweetener such that it maintains quality for prolong periods of time.

Exemplary Sweetener Compositions

According to some embodiments, a sweetener composition provided herein includes:
about 0.5% to about 10% by weight of the composition of a protein;
about 20% to about 95% by weight of the composition of a soluble fiber; and
about 0.015% to about 10% by weight of the composition of a sweetener.

According to some embodiments, the composition further includes a foam forming agent, such as a baking soda and/or an emulsifier. According to some embodiments, the composition further includes an emulsifier. According to some embodiments, the composition further includes a baking soda (i.e., sodium bicarbonate).

According to some embodiments, a sweetener composition provided herein includes:
about 0.5% to about 10% by weight of the composition of a protein;
about 30% to about 95% by weight of the composition of a soluble fiber; and
about 0.015% to about 5% by weight of the composition of a sweetener.

According to some embodiments, the composition further includes a foam forming agent, such as a baking soda and/or an emulsifier. According to some embodiments, the composition further includes an emulsifier. According to some embodiments, the composition further includes a baking soda (i.e., sodium bicarbonate).

According to some embodiments, a sweetener composition provided herein includes:
about 0.5% to about 10% by weight of the composition of a protein;
about 35% to about 95% by weight of the composition of a soluble fiber; and
about 0.015% to about 4% by weight of the composition of a sweetener.

According to some embodiments, the composition further includes a foam forming agent, such as a baking soda and/or an emulsifier. According to some embodiments, the composition further includes an emulsifier. According to some embodiments, the composition further includes a baking soda (i.e., sodium bicarbonate).

According to some embodiments, a sweetener composition provided herein includes:
   about 1% to about 8% by weight of the composition of a protein;
   about 40% to about 95% by weight of the composition of a soluble fiber; and
   about 0.015% to about 3% by weight of the composition of a sweetener.

According to some embodiments, the composition further includes a foam forming agent, such as a baking soda and/or an emulsifier. According to some embodiments, the composition further includes an emulsifier. According to some embodiments, the composition further includes a baking soda (i.e., sodium bicarbonate).

According to some embodiments, a sweetener composition provided herein includes:
   about 0.5% to about 10% by weight of the composition of a protein;
   about 20% to about 95% by weight of the composition of a soluble fiber; and
   about 0.015% to about 0.5% by weight of the composition of a sweetener.

According to some embodiments, the composition further includes a foam forming agent, such as a baking soda and/or an emulsifier. According to some embodiments, the composition further includes an emulsifier in an amount between about 2% to about 0.01% by weight of the composition. According to some embodiments, the composition further includes a baking soda (i.e., sodium bicarbonate).

According to some embodiments, a sweetener composition provided herein includes:
   about 1% to about 7% by weight of the composition of a protein;
   about 40% to about 80% by weight of the composition of a soluble fiber; and
   about 0.05% to about 0.4% by weight of the composition of a sweetening agent.

According to some embodiments, the composition further includes a foam forming agent, such as a baking soda and/or an emulsifier. According to some embodiments, the composition further includes an emulsifier in an amount between about 2% to about 0.01% by weight of the composition. According to some embodiments, the composition further includes a baking soda (i.e., sodium bicarbonate).

According to some embodiments, a sweetener composition provided herein includes:
   about 2% to about 5% by weight of the composition of a protein;
   about 40% to about 70% by weight of the composition of a soluble fiber; and
   about 0.08% to about 0.2% by weight of the composition of a sweetening agent.

According to some embodiments, the composition further includes a foam forming agent, such as a baking soda and/or an emulsifier. According to some embodiments, the composition further includes an emulsifier in an amount between about 2% to about 0.01% by weight of the composition. According to some embodiments, the composition further includes a baking soda (i.e., sodium bicarbonate).

According to some embodiments, a sweetener composition provided herein includes:
   about 1% to about 7% by weight of the composition of a protein;
   about 15% to about 25% by weight of the composition of a first fiber;
   about 30% to about 50% by weight of the composition of a second fiber; and
   about 0.08% to about 0.2% by weight of the composition of a sweetening agent.

According to some embodiments, the composition further includes a foam forming agent, such as a baking soda and/or an emulsifier. According to some embodiments, the composition further includes an emulsifier in an amount between about 2% to about 0.01% by weight of the composition. According to some embodiments, the first fiber is corn dextrin and the second fiber is oligofructose. According to some embodiments, the composition further includes a baking soda (i.e., sodium bicarbonate).

According to some embodiments, the sweetener composition consists essentially of at least one fiber, at least one protein, and at least one sweetening agent. According to some embodiments, the sweetener composition consists essentially of at least one fiber, at least one protein, at least one sweetening agent, and at least one emulsifier. According to some embodiments, the sweetener composition consists essentially of at least one fiber, at least one protein, at least one sweetening agent, and a baking soda. According to some embodiments, the sweetener composition consists essentially of at least one fiber, at least one protein, at least one sweetening agent, at least one emulsifier, and a baking soda.

Methods of Use

The sweetener compositions as disclosed herein are suitable for sweetening foods and/or beverages and/or drinks (hot as well as lukewarm). The consumer may mix one or more (typically between 1 to 4) sweetener products with, for example, a hot drink and by that obtain a sweet drink which is nutritious and affords prolonged feel of satiety. According to some embodiments, each sweetener product provides a sweetness level that is equivalent to about half teaspoon sugar. According to some embodiments, each sweetener product provides a sweetness level that is equivalent to about 1.5-3 grams sugar.

The sweetener compositions as disclosed herein are further suitable as a stand-alone sweet snack or confectionery or meringue.

Method of Manufacturing

The present invention further provides methods of preparing a sweetener composition as provided herein. One optional method includes the steps: solubilizing protein in water and mixing; vigorously mixing the obtained solution and while doing so adding a sweetening agent, optionally an emulsifier, and fibers to thereby obtain a foamy mixture; pouring portions of the foamy mixture into a working surface or conveyor belt in a predefined having the shape and size of a meringue confectionary; and drying the mixtures, to thereby obtain confectionary sweetener. For example, when the total weight of the protein, sweetening agent and fibers is 1 Kg, the total weight of the liquid mixed with the protein, sweetening agent and fibers is in the range of 0.4-0.6 Kg.

Another optional method includes the steps of mixing a protein with a sweetening agent and fibers, solubilizing the mixture of protein, a sweetening agent and fibers in water to thereby obtain a foamy mixture, pouring the foamy mixture on the into a working surface or conveyor belt in a predefined having the shape and size of a meringue confectionary; and drying the mixtures, to obtain confectionary sweetener.

The method includes one or more of the following steps (not necessarily in the herein presented order):
   i) mixing a quantity of protein with a sweetening agent and fibers;

ii) the mixture is solubilized in water or another liquid;
iii) the solution of step (ii) is vigorously mixed to obtain a foamy solution;
iv) pour the mixture to a working surface or conveyor belt in a predefined shape and size of a meringue confectionary and dry using an oven.

According to some embodiments, step i) includes mixing the water with a foam forming agent (such as a baking soda; sodium bicarbonate). According to some embodiments, step ii) is performed with water having a temperature of up to about 30° C., or within the range of about 4° C. to about 30° C. (e.g., at 8° C.). According to some embodiments, step ii) is performed at a temperature of up to about 30° C., or within the range of about 4° C. to about 30° C. (e.g., at 8° C.) to period of about a few minutes (e.g., 10 minutes). According to some embodiments, step iii) is performed using, for example a beater (optionally at high speed) or a continuous aerator. According to some embodiments, step iv) may be performed for a few minutes (e.g., about 5 minutes) and up to about an hour. For example, step iv) may be performed for a time period of between about 1 minute to about 60 minutes, between about one minute to between about 30 minutes, or between about 1 minute to about 10 minutes. According to some embodiments, the obtained foamy solution of step iv) may preserve its texture for a few minutes and up to a few hours (e.g., about 4 hours) at a temperature below 20° C. According to some embodiments, the sweetening agent and emulsifier are added slowly and the fibers are added thereafter. According to some embodiments, the poured composition of step iv) are dried at an oven at a temperature of between about 40° C. to about 85° C. for a time period of 3 hours or below, or for a period of 2 hours or below, or for a period of between about 20 minutes to about 3 hours, to thereby obtain meringues. According to some embodiments, the composition is dried to reduce the moisture (or water content) from about 20%-40% and up to about 6%, preferably no more than about 4%, to thereby obtain a crispy product that is microbial resisting. According to some embodiments, the moisture inside the oven should not exceed 80%. According to some embodiments, the method further provides a step vi) in which the meringue products obtained are packed into packages having a barrier that prevents gas and moisture penetration. According to some embodiments, the meringues are aery and have a final moisture of between about 2% to about 6% by weight of the composition.

EXAMPLES

The invention will be described in greater detail by way of specific examples. The following examples are offered for illustrative purposes, and to exemplify the foamable compositions and methods described herein and are not intended to limit the invention in any manner. Many variations will suggest themselves and are within the full intended scope. Those of skill in the art will readily recognize a variety of non-critical parameters which can be changed or modified to yield essentially the same results.

Example 1. Method of Manufacturing an Aery Solid Sweetener Composition (i) water having a temperature within the range of between about 4° C. to about 30° C. (e.g., about 8° C.) is mixed with sodium bicarbonate until the sodium bicarbonate is completely dissolved;

(ii) adding and dissolving sucralose, emulsifier, and fibers protein to the sodium bicarbonate solution of step (i);
(iii) mixing the mixture obtained from step (ii) at 4° C. to about 10 minutes;
(iv) vigorously mixing the mixture of step (iii) with a beater at high speed to obtain a foamy mixture;
(v) pouring the mixture to a working surface or conveyor belt in a predefined shape and size of a meringue confectionary and drying (the obtained foam preserves texture for a few hours (e.g., about 4 hours) at a temperature below 20° C.); and
(vi) the meringue products is dried at oven at a temperature of about 70° C.-80° C. for a period of about 0.5 to about 2 hours (moisture inside the oven should preferably not exceed about 60%).

The meringue products obtained are aery and have a final moisture of between 2% to 4%.

The meringue products are packed into packages having a barrier that prevents gas and moisture penetration. The resulting sweetener composition of some exemplary embodiments has a bulk density of 103 gr/l±5.

TABLE I a sweetener composition (a wet base)

| Ingredient | (w/w %) |
|---|---|
| A vegetable protein (potato; solanic 300) | 3.5%-4% |
| Corn dextrin (Nutriose ® 06) | 20%-22% |
| Oligofructose (Orafti ® 95) | 40%-42% |
| Sucralose | 0.156% |
| Sodium bicarbonate | 0.36% |
| Emulsifier (such as sucrose ester (PS750)) | 0.062% |
| Water | 30-35% |

TABLE II a sweetener composition (dry matter; with 4% moisture)

| Ingredient | (w/w %) |
|---|---|
| A vegetable protein (wheat) | 4.8%-5% |
| Corn dextrin (Nutriose ® 06) | 29.5% |
| Oligofructose (Orafti ® 95) | 59% |
| Sucralose | 0.22% |
| Sodium bicarbonate | 0.52% |
| Emulsifier (such as sucrose ester (PS750)) | 0.088% |

TABLE III a sweetener composition with salt

| Ingredient | (w/w %) |
|---|---|
| A vegetable protein (seaweed) | 4.8%-5% |
| Corn dextrin (Nutriose ® 06) | 29.5% |
| Oligofructose (Orafti ® 95) | 59% |
| Sucralose | 0.22% |
| Salt | 0.35% |

TABLE IV nutrition facts

| Value | Per 100/gr | Per meringue unit/product 0.4/gram |
|---|---|---|
| Calories/kcal | 220 | 0.88 |
| Protein/grams | 4.9 | 0.02 |
| Carbohydrates/grams | 89 | 0.356 |

TABLE IV-continued nutrition facts

| Value | Per 100/gr | Per meringue unit/product 0.4/gram |
|---|---|---|
| Fibre/grams | 78 | 0.32 |
| Sodium (milligrams) | 1.5 | ≤0.06 |

Although exemplary embodiments and methods for use have been described in detail above, those skilled in the art will understand that many variations are possible without departing from the spirit and scope of the invention, which is limited only by the appended claims.

General Definitions

Each of the following terms written in singular grammatical form: 'a', 'an', and 'the', as used herein, means 'at least one', or 'one or more'. Use of the phrase 'one or more' herein does not alter this intended meaning of 'a', 'an', or 'the'. Accordingly, the terms 'a', 'an', and 'the', as used herein, may also refer to, and encompass, a plurality of the stated entity or object, unless otherwise specifically defined or stated herein, or, unless the context clearly dictates otherwise.

Each of the following terms: 'includes', 'including', 'has', 'having', 'comprises', and 'comprising', and, their linguistic/grammatical variants, derivatives, or/and conjugates, as used herein, means 'including, but not limited to', and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof. Each of these terms is considered equivalent in meaning to the phrase 'consisting essentially of.'

Each of the phrases 'consisting of' and 'consists of', as used herein, means 'including and limited to.'

The phrase 'consisting essentially of', as used herein, means that the stated entity or item (composition, product, material, method or process, step or procedure, sub-step or sub-procedure), which is an entirety or part of an exemplary embodiment of the disclosed invention, or/and which is used for implementing an exemplary embodiment of the disclosed invention, may include at least one additional component or ingredient, but only if each such additional component or ingredient does not materially alter the basic novel and inventive characteristics or special technical features, of the claimed entity or item.

The term 'method', as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Throughout this disclosure, a numerical value of a parameter, feature, characteristic, object, or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range 'from 1 to 6' also refers to, and encompasses, all possible sub-ranges, such as 'from 1 to 3', 'from 1 to 4', 'from 1 to 5', 'from 2 to 4', 'from 2 to 6', 'from 3 to 6', etc., and individual numerical values, such as '1', '1.3', '2', '2.8', '3', '3.5', '4', '4.6', '5', '5.2', and '6', within the stated or described numerical range of 'from 1 to 6'. This applies regardless of the numerical breadth, extent, or size, of the stated or described numerical range.

Moreover, for stating or describing a numerical range, the phrase 'in a range of between about a first numerical value and about a second numerical value', is considered equivalent to, and meaning the same as, the phrase 'in a range of from about a first numerical value to about a second numerical value', and, thus, the two equivalently meaning phrases may be used interchangeably. For example, for stating or describing the numerical range of room temperature, the phrase 'room temperature refers to a temperature in a range of between about 20° C. and about 25° C.', and is considered equivalent to, and meaning the same as, the phrase 'room temperature refers to a temperature in a range of from about 20° C. to about 25° C.'

The term 'about', as used herein, refers to ±10% of the stated numerical value.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub combination in the context or format of a single embodiment, may also be illustratively described and presented in the context or format of a plurality of separate embodiments.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An edible composition comprising:
   at least one type of a soluble protein; and
   at least one type of a soluble fiber,
   wherein the amount of the soluble fiber is at least about 80% by weight of the composition, and wherein the amount of the soluble protein is between about 1.5% to about 10% by weight of the composition,
   wherein the protein is a plant derived protein,
   wherein said soluble fiber comprising a combination of a first fiber and a second fiber, and
   wherein the first fiber is cyclodextrin.

2. The edible composition according to claim 1, wherein said soluble fiber is selected from the group consisting of: oligofructose, cyclodextrin, corn dextrin, wheat dextrin and a combination thereof.

3. The edible composition according to claim 1, wherein the second fiber is an oligofructose.

4. The edible composition according to claim 1, wherein the second fiber is present in the composition in an amount of at least about 30% by weight of the composition and wherein the first fiber is present in the composition in an amount of at least about 15% by weight of the composition.

5. The edible composition according to claim 1, having an aerated solid food product form.

6. The edible composition according to claim 5, being in the form of a meringue confectionery.

7. The edible composition according to claim 1, further comprises at least one type of a sweetening agent.

8. An edible composition comprising:
   at least one type of a soluble protein; and
   at least one type of a soluble fiber,
   wherein the amount of the soluble fiber is at least about 80% by weight of the composition, and wherein the amount of the soluble protein is between about 1.5% to about 10% by weight of the composition,
   wherein the protein is a plant derived protein, and
   wherein the edible composition having an aerated solid food product form.

9. The edible composition according to claim 8, wherein said soluble fiber is selected from the group consisting of: oligofructose, cyclodextrin, corn dextrin, wheat dextrin and a combination thereof.

10. The edible composition according to claim 8, wherein said soluble fiber comprising a combination of a first fiber and a second fiber.

11. The edible composition according to claim 10, wherein the first fiber is a corn dextrin and wherein the second fiber is an oligofructose.

12. The edible composition according to claim 10, wherein the first fiber is cyclodextrin.

13. The edible composition according to claim 10, wherein the first fiber is wheat dextrin.

14. The edible composition according to claim 10, wherein the second fiber is present in the composition in an amount of at least about 30% by weight of the composition and wherein the first fiber is present in the composition in an amount of at least about 15% by weight of the composition.

15. The edible composition according to claim 8, being in the form of a meringue confectionery.

16. The edible composition according to claim 8, further comprises at least one type of a sweetening agent.

* * * * *